Dec. 18, 1951 W. F. CRAWFORD 2,579,140

WAVE PROJECTOR

Filed March 13, 1946 4 Sheets-Sheet 1

INVENTOR.

WALTER FREEMAN CRAWFORD

BY

Hammond & Littell

ATTORNEYS

Dec. 18, 1951

W. F. CRAWFORD

WAVE PROJECTOR 2,579,140

Filed March 13, 1946

4 Sheets-Sheet 2

INVENTOR.

WALTER FREEMAN CRAWFORD

BY

Hammond & Littell

ATTORNEYS

Dec. 18, 1951 W. F. CRAWFORD 2,579,140

WAVE PROJECTOR

Filed March 13, 1946 4 Sheets-Sheet 3

INVENTOR.

WALTER FREEMAN CRAWFORD

BY

Hammond & Littell

ATTORNEYS

Dec. 18, 1951

W. F. CRAWFORD 2,579,140

WAVE PROJECTOR

Filed March 13, 1946

4 Sheets-Sheet 4

INVENTOR.
WALTER FREEMAN CRAWFORD
BY
Hammond & Littell
ATTORNEYS

Patented Dec. 18, 1951

2,579,140

UNITED STATES PATENT OFFICE 2,579,140

WAVE PROJECTOR

Walter Freeman Crawford, Maplewood, N. J.

Application March 13, 1946, Serial No. 654,203

15 Claims. (Cl. 250—33.65)

This invention relates to a reflector system especially adapted for the transmission of electromagnetic waves and particularly the projection of such waves in a single beam of parallel rays.

When electromagnetic energy is to be transmitted, whether in an automobile headlight, a radiant heating device, a television set, a radio antenna, or any other field, and also supersonics, some of the problems requiring consideration are how to effect the capture of as much energy from a source as possible; how best to convert the generally spherical spread of the rays at that source into a beam of maximum intensity directed towards a designated spot or area; what materials to use and what surfaces to employ to re-direct the maximum number of rays with a minimum loss from absorption; and how to shape and collectively to arrange those surfaces to obtain the least "damping" or interference between the waves, the fewest number of reflections, or refractions, and the minimum amount of divergence from the selected paths. As described hereafter, these problems are more completely mastered in the reflector system of the present invention than in any known prior embodiment. This result is accomplished by reflecting all the rays at lease once, but no ray needs to be reflected more than three times. The system consists, in a preferred embodiment, chiefly of a combination of two paraboloidal sections, one spherical section and one plane section.

When such a reflector system is used in connection with electromagnetic waves in the visible light band, a more efficient beam is produced than is possible by using any know prior arrangement, since all the waves are utilized and all are transmitted, under controlled conditions of direction, strength, intensity and polarization and with the least possibility of waste and loss through stray or imperfectly controlled rays.

When used in connection with waves in the ultra-short or micro-wave radio bands, a maximum use of the expended energy is obtained and more precise focusing and fractional modulation are permitted, because (a) no rays of the fundamental carrier are intentionally damped, either to secure, or to avoid, a condition of interference; (b) each of the parallel rays, or any group forming a section of the beam, may be individually or collectively redirected; and (c) each ray, or any group, by the use of appropriate supplemental devices, may be separately modulated.

In no other known reflector system are all of the waves emitted by an electromagnetic source in any part of the spectrum brought under control and re-directed to form a single, parallel beam. Direct rays invariably either escape in uncorrected directions or else they are intentionally absorbed or damped out.

In the reflector system described herein, however, no rays are lost or permitted to diverge; all are controlled to form a beam of parallel rays. With a point source of electromagnetic waves, all rays can be projected from my system in truly parallel lines, affected only by the efficiency of the reflecting surfaces, by the accuracy of the workmanship, and by the stability of the parts in relationship to each other. This would not be true of any other reflector system.

One object of this invention is to obtain better efficiency, economy, and utility in the directional transmission of electromagnetic waves by converting into parallel beams all the rays emitted by the source. Theoretically, no waves are lost and the maximum amount of controlled energy is emitted from the system.

Another object of this reflector system is to reduce to a minimum the possibility of an emission of non-parallel rays. As a consequence, in such applications as vehicular-headlights for example, the glare which results from uncontrolled, direct light rays may be completely avoided. Again, when this system is used in connection with intelligence-carrier applications, interference between adjacent beams pointed in the same general direction may be practically eliminated; and this is a point of special importance. If and when the present invention is used in connection with precisely directed transmissions, such as is required for communication systems, aiming devices, range finders, radiant heating or X-ray equipment, etc., high efficiency theoretically may be developed for the first time.

Another object of this reflector system is to obtain a beam of two or more separate components, the parallel components being utilized separately or in combination. Partial dispersion may be combined with precise concentration, or the beam components may be simultaneously employed to serve two or more separate functions.

Another object of this invention is to project a beam of maximum strength in waves of a single frequency. The elements can be precisely matched with the wave-lengths emitted. Waves, in the process of being reflected by my system may be reinforced and strengthened by an appropriate choice in the size of the reflector units used so that they may match exactly, balance, or perform their reflective functions in synchronism with the wave-length or wave-lengths of the electromagnetic emission being reflected. So long as the various units are kept in proper relationship to each other, the size of the elements individually or collectively may be varied as desired. Within obvious practical limits, such matching of the parts is readily accomplished. Many advantages may be realized by a careful matching of the size of the reflector units and the frequency employed, among which may be named the transmission of waves of limited strength over greater distances, and the reduction or elimination of undesirable or harmful effects of certain waves. The latter effect is achieved, for example, by altering the size of the spherical reflector to cause an internal interference among those waves while at the same time reinforcement is obtained in the preferred wave-lengths.

Another object of this invention is to create a beam which may be precisely focused or evenly dispersed, at will, through the application of commonly-used refractive or reflective devices. Exact focusing is possible because all waves are projected from my system in parallel rays. It is obviously advantageous in a refractive system to have the beam enter the refractive element in a plane wave-front perpendicular to the axis of that element. Any method of refraction, ordinary lenses, magnetic lenses, or dielectric media, as preferred, may be used either to concentrate the rays on any selected spot or field, or to spread the rays in any directions desired. In the latter case, the evenly graduated intensity of the beam throughout its cross-section permits the dispersion of the rays in an essentially uniform diffusion through the use of appropriate complementary devices. The same features which promote efficiency in focusing make possible a spreading of the rays in any selected directions or coverage patterns.

Finally, as a result of all waves being fully controlled and all rays being transmitted in practically parallel lines, new methods of modulation are possible by the use of appropriate equipment. For example, any fractional part of the beam, even each individual ray, can carry its own particular wave modulation. Any method of modulation is possible, e. g., amplitude, frequency, time-pulse or phase, by varying through suitable supplemental devices any one, or any combination, of the characteristics of the carrier wave in proportion to similar characteristics of other waves in another part of the electromagnetic wave spectrum, ordinarily in the audible or visible range. When used as a receiving system, this invention may be so made that it is complementary in every way to the transmitting system. In such use, for example, the image or intelligence impressed upon a carrier at an appropriate intermediate point within, or exterior to, the transmitting equipment may be exactly reproduced at a corresponding point in, or associated with, the receiving equipment. Demodulation would therein be effected by processes which may be similar to, and by devices complementary to, those used to obtain the desired modulation. The word "projector" is to be construed as also meaning receiver, and "source of energy" as the receiving or concentration locus. "Projecting" is to be construed as including receiving.

It is recognized that a true point source is generally considered to be unattainable; that absolutely perfect curvatures in reflecting or refracting surfaces have not yet been developed in common manufacturing practice; that all surfaces absorb a small but definite fraction of the energy of the waves being reflected or refracted; that the stability of the component parts is relative rather than complete; and that a certain amount of interference by the supporting elements of the various units in a system is unavoidable. It is one of the objects of this system to minimize as far as possible these physical limitations by using the fewest number of, and the simplest, reflecting surfaces of appropriate curvature which will accomplish the stated result; by providing maximum stability and rigidity of the units; by using transparent supports for the units wherever possible; and while restricting the size of the source to as small an area as practicable, by making any necessary extension of the source in one dimension only and to match such extension by a similar and proportionate expansion of the various reflecting elements and complementary units in the same direction.

These and other objects of the invention will become apparent from the following description and drawings which are merely exemplary.

Figures 4, 5:
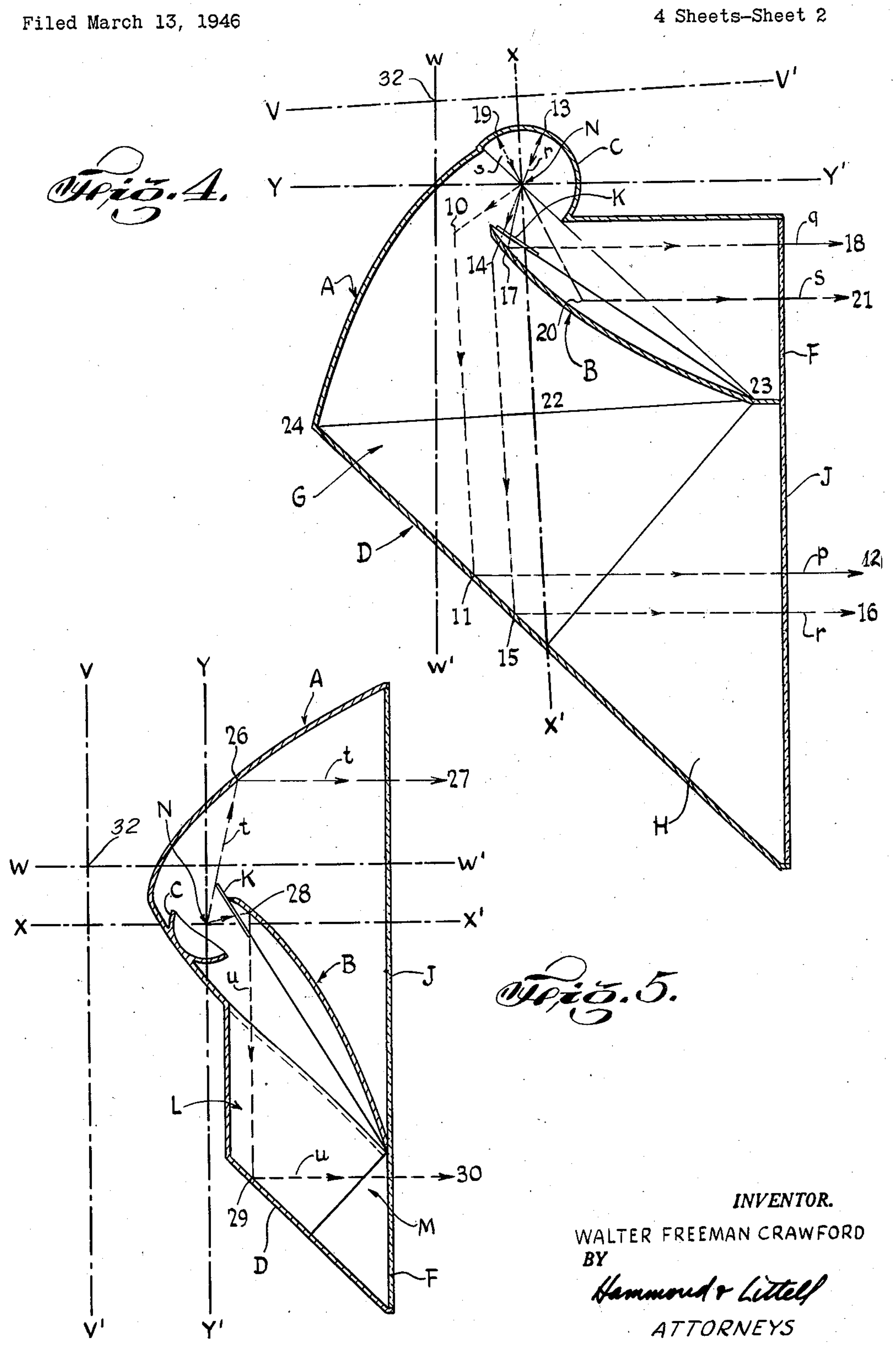
Fig. 4 is a sectional view of a modification of the invention taken through the axes of the two paraboloidal sections, the aperture angle of the primary paraboloidal section being less than 90°, certain of the rays and portions thereof being shown in a line having short dashes, said rays being in the cut-away part of the cross section.

Fig. 5 is a sectional view of another modification of the invention taken through the axes of the two paraboloidal sections, the aperture angle of the primary paraboloidal section being more than 90°. The minor beam ($u$) in this modification is doubly or triply reflected, certain of the rays and portions thereof being shown in a line having short dashes, said rays being in the cut-away part of the cross section.

Figures 6, 7:
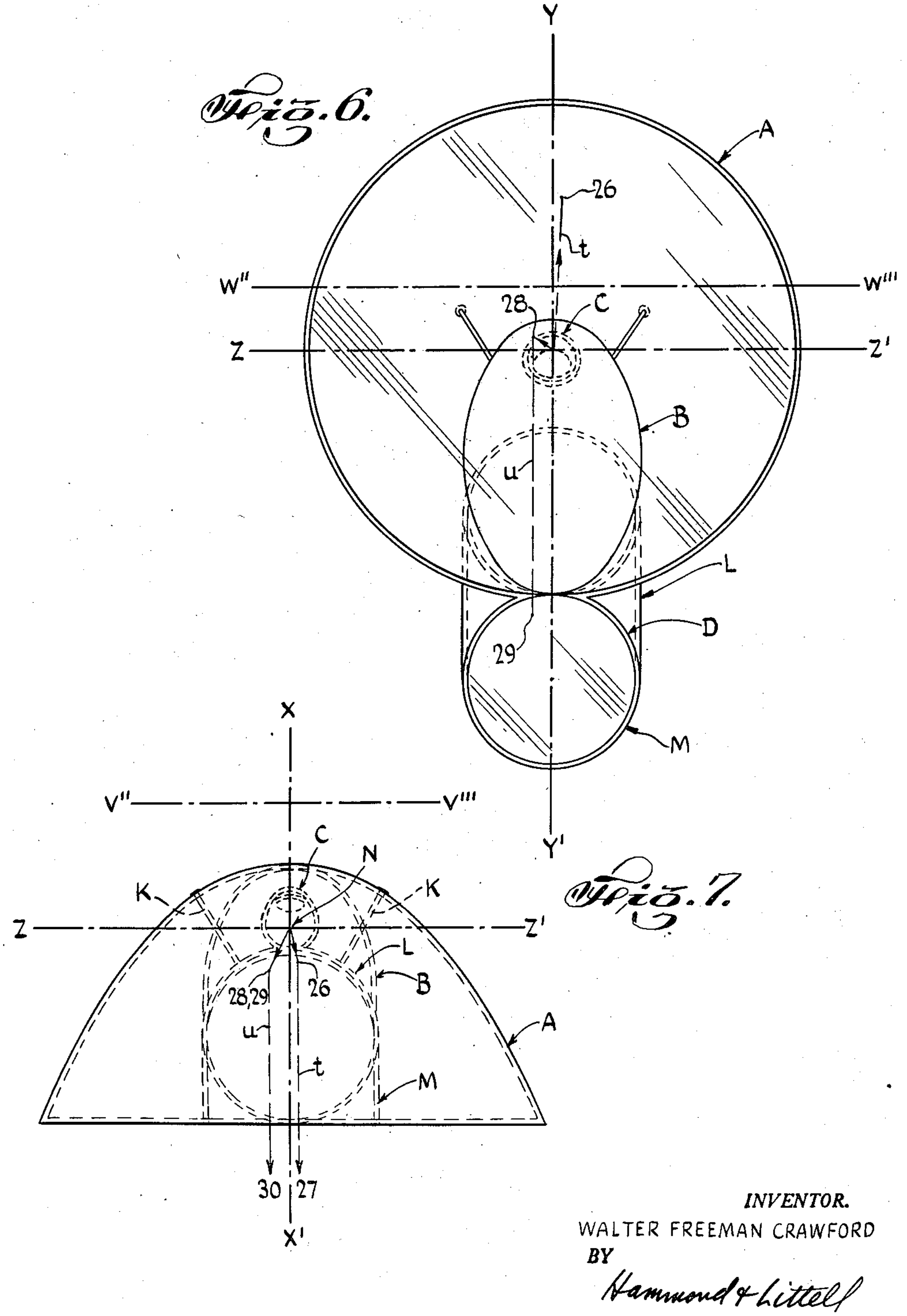

Fig. 6 is a front elevation of the system shown in Fig. 5 in a plane parallel to the directrix of the primary paraboloidal section.

Fig. 7 is a horizontal plan view of the modification of Fig. 5 taken along the plane of the directrix of the primary paraboloidal section.

Figures 8, 9:
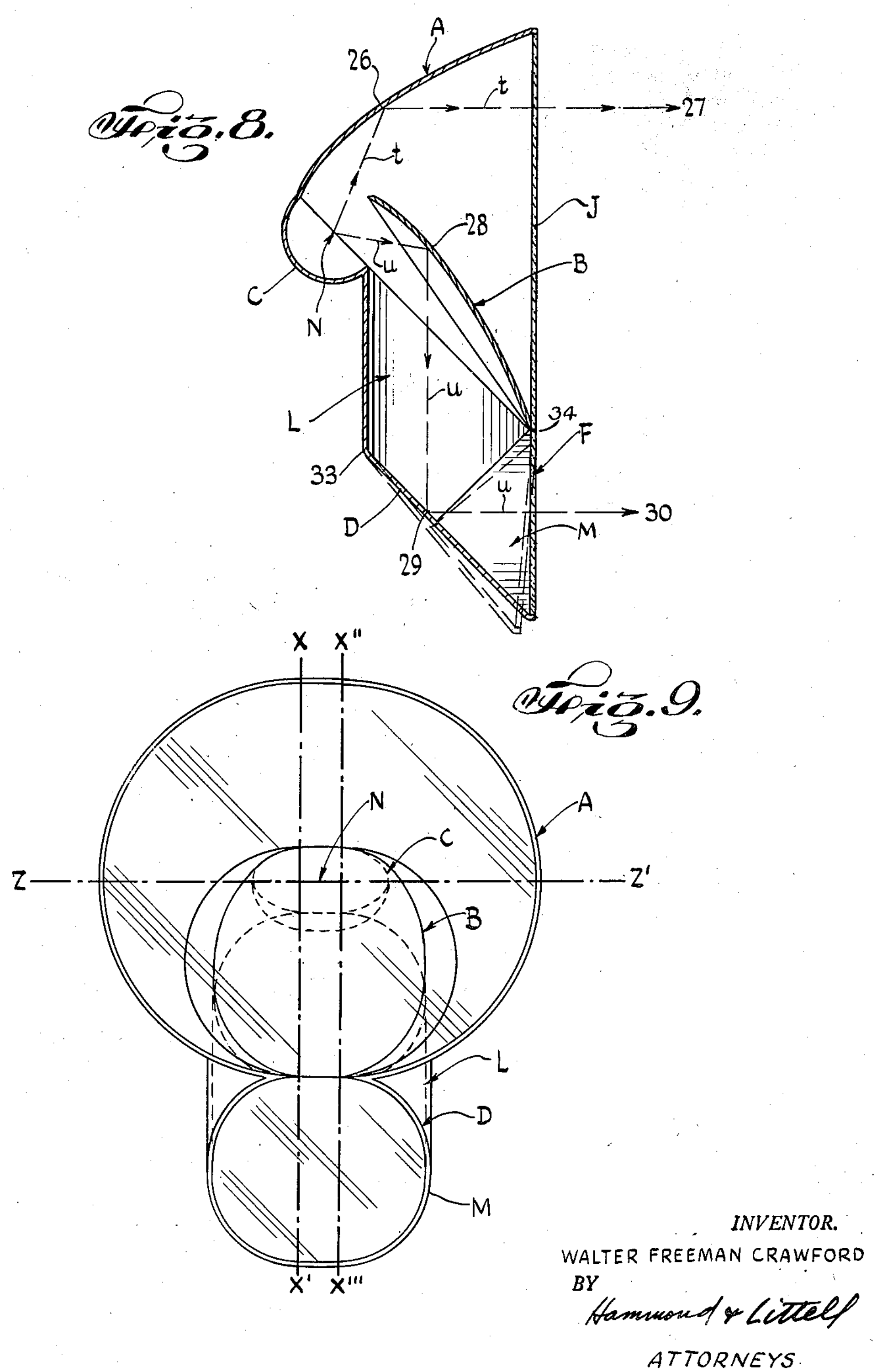

Fig. 8 is a sectional view through another modification of the invention taken through the axes of the two paraboloidal sections.

Fig. 9 is a front elevation of another modification of the system of Fig. 8 in a plane parallel to the directrix of the primary paraboloidal section.

In the various embodiments illustrated herein of the reflector system there are elements common to more than one embodiment. One of these is a primary concave paraboloidal section. The inner surface thereof is of such material (or so treated) that electromagnetic energy of the wave-lengths selected may be reflected from the source located at the focus directly outward in lines parallel to the axis of the paraboloid. As one example of a suitable material, polished aluminum may be used. The two critical dimensions of this unit are the parameter of the basic parabolic line, and its aperture angle (angle subtended by lines connecting opposite edges of the aperture to the focus in any axial plane). If desired, the size of the paraboloid, and the corresponding basic parabolic line, may be expressed in terms of the distance of any point on that line from the focus providing the angle between a straight line connecting that point and the focus and the axis of the parabolic line also is given or can be computed.

Another common element is a secondary concave paraboloidal section with an appropriate inner reflecting surface and having the same focus as the primary paraboloidal section, the secondary section being of such size and being so positioned that all rays normally escaping through the aperture of the primary section are intercepted and reflected from the source located at the focus in lines parallel to the axis of the secondary element. The maximum size of the secondary paraboloidal reflector is determined by extending a line from the point of intersection of the two paraboloids, through the focus, to the point where said line intercepts the primary paraboloid on the opposite side of the focus. The point where a line drawn from said last mentioned interception point perpendicular to the axis of the secondary paraboloid intercepts the line defining one side of the aperture angle fixes the location of the point on the secondary which is closest to the focus.

Figures 1, 2:
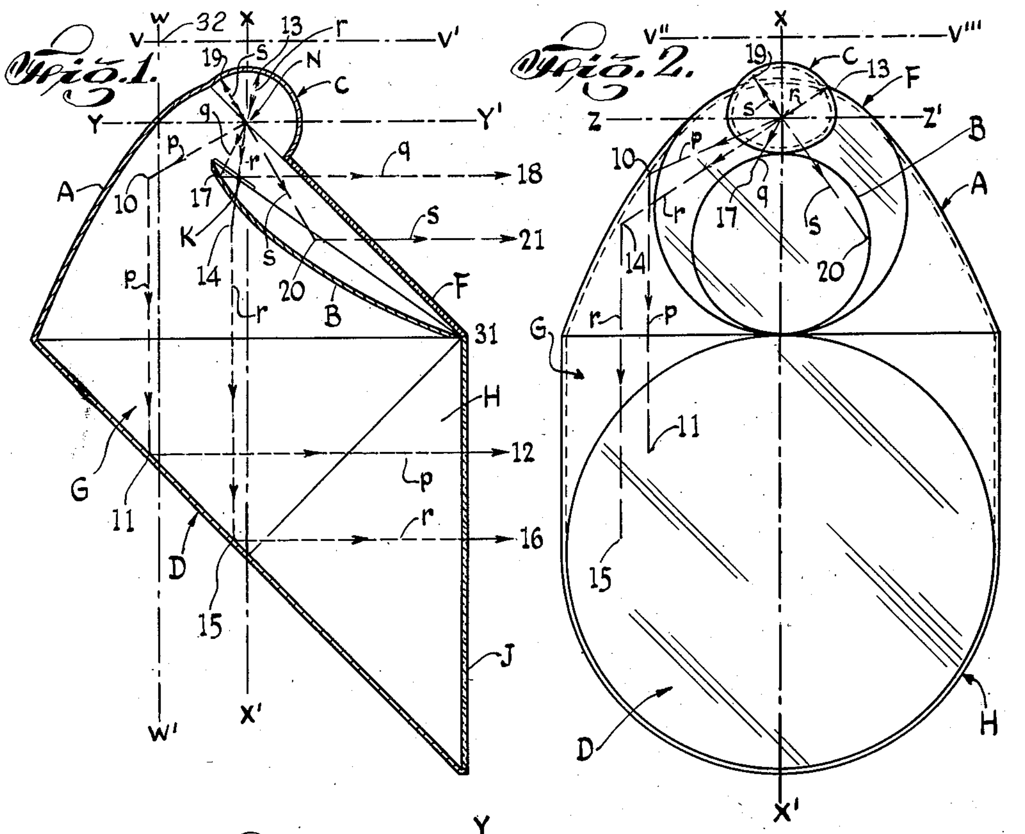
Fig. 1 is a sectional view through the axes of the two paraboloidal sections in a plane perpendicular to the directrices thereof, certain of the rays and portions thereof being shown in a line having short dashes, said rays being in the cut-away part of the cross section.
Fig. 2 is a front elevation of the system shown in Fig. 1 in a plane parallel to the directrix of the secondary paraboloidal section.
Figure 3:
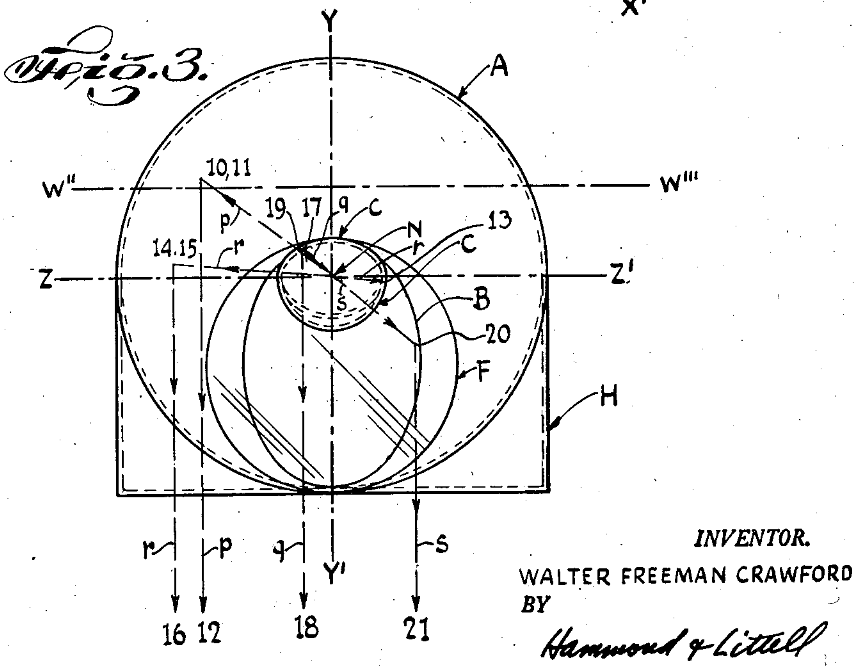
Fig. 3 is a plan view of the reflector system of Figs. 1 and 2 taken in the plane of the directrix of the primary paraboloidal section.

It may be noted that in one embodiment, such as seen in Figs. 1–3, wherein the aperture angle is exactly 90°, the parameter of the secondary paraboloid is the same as that of the primary. Where the aperture angle exceeds 90°, the parameter of the secondary may be kept approximately the same as the primary by tilting the axis of the secondary away from the line of intersection of the directrices. Some of the collateral dependent dimensions involved for specific variations in size and in angular relationships are given by way of example in the table.

A third element common to all embodiments is a hollow spherical shell, of size and edge-shape hereafter described, and inclined to the directrices of the two paraboloidal sections. Where a 90° aperture angle is employed, the concave spherical reflector is adjacent to and contiguous with the primary paraboloidal reflector unit, with a radius equal to the shortest distance between either paraboloidal section and the focus. As might be expected, therefore, it has been found that those embodiments employing a 90° aperture angle, or those most closely approaching the 90° aperture angle, provide the most efficient embodiments and the ones which would be easiest generally to manufacture.

In the embodiments where an aperture angle of greater or less than 90° is used, the radius and altitude of the zone partially or fully covered by the spherical shell may be appropriately modified. Also, in those embodiments where a minimum amount of reflection is preferred, as in the system shown in Figs. 5–7, the edge of the spherical section may be further modified so that only those rays are intercepted and returned to the focus which either would be reflected by the primary paraboloidal section into the secondary paraboloidal reflector unit, or would strike the primary paraboloidal section in the area which has to be cut away to permit the passage of the beam reflected by the secondary unit. All other embodiments, for convenience, are shown using a concave hemispherical shell.

The fourth major unit in the reflector system is a plane reflecting surface inclined at a selected angle to the directrices of the paraboloids to reflect either the beam from the primary reflector in a direction parallel, or approximately parallel, to the axis of the secondary paraboloid, or the beam from the secondary paraboloid parallel to the axis of the primary paraboloid. In its normal position, the plane section is parallel to a plane bisecting the intersection of the directrices. Where the embodiment uses a 90° aperture angle, therefor, a 45° angle is formed between this plane (or this plane extended) and each of the directrices. In general, an elliptical-shaped area of this plane is utilized, said elliptical area becoming elongated if and as the plane is tilted a small amount on its minor axis toward the line of intersection of the directrices of the paraboloids; and the area approaches a circle as the plane is similarly tilted away from that line.

Other units, as shown in the specific illustrative embodiments of the drawings, include supports for the four major members of my reflector system, units which serve to enclose the system, and parts needed to control the transmitted beam in some conventional manner.

Certain features of the system should be noted which permit the system to be harmoniously synchronized with selected wave-length which it is desired to transmit, or to obtain new and novel methods of beam modulation previously referred to. In the first place, the radius of the spherical shell is chosen as an odd-quarter multiple of the wave-length to be reflected, in line with the established physical fact that when a ray is reflected back through its focus by a concave spherical reflector, its wave becomes one-half of a wave-length out of phase. Hence, in order to synchronize the direct waves and the reflected waves as they move in the same direction away from the focus, and in order to permit the latter to supplement and reinforce the former, the overall distance traveled by a ray reflected by the spherical unit must be precisely one-half of one wave-length shy of an even multiple of the particular wave-length being transmitted. Such a condition is obtained when the radius of the spherical reflector is made 1/4, 3/4, 5/4, 7/4, or $$\frac{2n-1}{4}$$

(where $n$ is any positive integer) of one wave-length.

The other major units may be harmoniously constructed in appropriate relationships to the radius of the spherical shell. In certain embodiments where a hemispherical unit is used, this radius related to the size of the aperture angle determines the limits of the parameter of the paraboloidal sections employed. Numerous combinations are possible. It should be noted, however, (as indicated by the illustrative dimensions given for Figs. 8 and 9 in the table) that, where an aperture angle of 90° is used and the radius of the spherical shell is an integral multiple of a unit length, the parameters of the primary and secondary paraboloidal sections are identical; that this parameter can be expressed only by the use of two terms, one of which includes $\sqrt{2}$, and that the additional distance traveled by a ray reflected by the secondary paraboloid again requires the use of still two more terms, one of which includes $\sqrt{2}$. Hence, in order to keep the waves in phase in the two beams, a proper complementary length may be added to the cylindrical section L, as shown in Fig. 8. In the embodiments where less than a hemispherical unit is used, or where an aperture angle greater than or less than 90° is preferred, a synchronization of the units and the wavelengths transmitted may be obtained by the use of the sizes and arrangements given in the illustrative dimensions in the table, or by modification thereof which will be evident to persons skilled in the art.

Element D (all embodiments) is the section of a plane reflector unit of such size and material as to reflect all rays in either a major or minor beam as desired and normally positioned to bisect the angle between two planes parallel to the directrices of the two paraboloidal sections (element A and element B). The surface may be arranged so that it can be tilted as illustrated in Fig. 8, or otherwise moved (not shown) so as to effect any desired change in the direction of the beam reflected thereby. In other arrangements it may be hinged at any point of joinder with one

*Table I*

| | Description | Figs. 1, 2, and 3 | Fig. 4 | Figs. 5, 6, and 7 | Figs. 8 and 9 |
|---|---|---|---|---|---|
| 1 | Parameter of element A | [1] 40 | [1] 400 | [1] 54 | $200+100\sqrt{2}$ |
| 2 | Dist. focus to directrix of A | 20 | 200 | 27 | $100+50\sqrt{2}$ |
| 3 | Min. dist. focus to reflector A | $40-20\sqrt{2}$ | 116 | 14.167 | [1] 100 |
| 4 | Max. dist. focus to reflector A | $40+20\sqrt{2}$ | 725 | 67.5 | $300+200\sqrt{2}$ |
| 5 | Radius aper. of A in plane perp. to axis | $20+20\sqrt{2}$ | [1] 500 | [1] 54 | $200+150\sqrt{2}$ |
| 6 | Dist. on axis focus to aper. A | $20+20\sqrt{2}$ | 525 | [1] 40.5 | $200+150\sqrt{2}$ |
| 7 | Aper. angle of A at focus in deg., min., sec | [1] 90–00–00 | 87–12–20.3 | 106–15–36.7 | [1] 90–00–00 |
| 8 | Approx. per cent direct rays reflec. by A of total | 35.4 | 36.2 | 45 | 35.4 |
| 9 | Parameter of element B | 40 | 380.0475 | 27 | $200+100\sqrt{2}$ |
| 10 | Angle between directrix of A and directrix of B | [1] 90–00–00 | 93–56–59.5 | 90–00–00 | [1] 90–00–00 |
| 11 | Min. dist. focus to reflector B | $40-20\sqrt{2}$ | 116 | 7.5 | [1] 100 |
| 12 | Max. dist. focus to reflector B | $40+20\sqrt{2}$ | 725 | 67.5 | $300+200\sqrt{2}$ |
| 13 | Approx. per cent direct rays reflected by B of total | 14.6 | 13.8 | 20.0 | 14.6 |
| 14 | Angle plane D and directrix of A | 45–00–00 | 46–58–29.25 | 45–00–00 | variable |
| 15 | Angle plane D and directrix of B | 45–00–00 | 46–58–29.25 | 45–00–00 | variable |
| 16 | Major axis ellipt. plane D | $80+80\sqrt{2}$ | 1465.588 | $36\sqrt{2}$ | $200+200\sqrt{2}$ |
| 17 | Minor axis ellipt. plane D | $40+40\sqrt{2}$ | 1000 | 36 | $200+100\sqrt{2}$ |
| 18 | Inside radius shell C | $40-20\sqrt{2}$ | [1] 125 | [1] 7.5 | 100 |
| 19 | Max. angle subtended by C at focus | 180–00–00 | 180–00–00 | 151–55–39.0 | 180–00–00 |
| 20 | Approx. per cent direct rays reflected by C | 50 | 50 | 35 | 50 |
| 21 | Length path direct ray source–A–to exit | $80+60\sqrt{2}$ | 1798.803 | 67.5 | $300+200\sqrt{2}$ |
| 22 | Same via B–to exit | $40+20\sqrt{2}$ | 798.803 | 103.5 | $500+300\sqrt{2}$ |
| 23 | Diam. hollow cylind. sect. G and H [2] | $40+40\sqrt{2}$ | 1000 | ---------- | ---------- |
| 24 | Diam. hollow cylind. sect. L and M [2] | ---------- | 400 | 36 | $200+100\sqrt{2}$ |
| 25 | Max. length L | ---------- | 511.134 | 36 | variable |
| 26 | Synchronized wave length | ---------- | 100 | 2; or 6 | ---------- |

[1] Selected value, using any convenient unit of linear or angular distance.
[2] In embodiments employing a hollow elliptical section instead of a hollow cylindrical section, the value shown represents the length of its minor axis.

As explained previously, units have certain portions thereof with the same general characteristics and these will be given the same letters in the various modifications, the letters denoting elements having the general characteristics noted hereafter.

Element A (all embodiments) is a primary reflecting paraboloidal section of a selected parameter or with a given minimum distance to its focus and having an aperture of selected radius, or subtending at its focus an aperture angle of some predetermined value.

Element B (all embodiments) is a secondary reflecting paraboloidal section of a selected parameter or with given minimum and maximum distance to its focus, the focus of B being the same as the focus of element A. The edge of the secondary reflecting paraboloidal section coincides with and intercepts at all points the cone of rays which would otherwise pass out of the system in divergent directions through the aperture of element A.

Element C (all embodiments) is the section of a concave spherical shell, not exceeding a hemisphere, of appropriate radius to permit, if desired, the synchronization of waves in the rays reflected back through the focus, the shell being of such size and material and so positioned as to intercept and return to the focus all rays which would otherwise strike the primary paraboloidal section element A in that area where the rays would be reflected by A into the secondary paraboloidal section or where the beam reflected by B would strike unit A were that portion of A not cut away.

of the paraboloidal sections or a cylindrical section, such not being illustrated.

Element F (all embodiments) is the section of a plane of suitable protective material or lens, transparent to rays of the wave-lengths to be reflected and inserted in and completely cutting across the beam initially created in the reflection by the paraboloidal section B.

Element G (Figs. 1–4) is the section of a hollow cylindrical shell (or of two semi-cylindrical shells separated by plane sections) whose axis (or axes) coincides with, or is parallel with an extension of the axis (or axes) of the primary paraboloidal section A, element G being used principally to enclose the system in the area embraced by the beam reflected by element A.

Element H (Figs. 1–4) is the section of a hollow cylindrical shell (or of two semi-cylindrical shells separated by plane sections) whose axis (or axes) intersects the axis (or axes) of unit G. Element H is used chiefly to enclose the system in the area embraced by the beam reflected by elements A and C.

Element J (all embodiments) is the section of a plane of suitable protective material or lens, transparent to the wave-lengths to be reflected and inserted in and completely cutting across the beam initially created in the reflection by paraboloidal section A.

Element K (Figs. 1–4) illustrates one type of conventional support to maintain element B in its proper position in relation to element A and the other units of this reflector system.

Element L is the section in certain of the embodiments (Figs. 5–9) of a hollow cylindrical shell (or of two semi-cylindrical shells separated by plane sections) used principally to enclose the system in the area embraced by the beam reflected by element B. As noted in Fig. 8, point 33 is lower than point 34, the length of L being varied so that the waves are in phase.

Element M is a section in certain of the embodiments (Figs. 5–9) of a hollow cylindrical shell (or of two semi-cylindrical shells separated by plane sections), of a hollow generally elliptical shell or shells or of both types in combination, whose axis (or axes) intersects the axis (or axes) of unit L. This element is used chiefly to enclose the system in the area embraced by the beam reflected by elements B and C.

Element N represents a source of light or any other suitable source of electromagnetic waves located at the focus of the primary and secondary paraboloidal sections.

In addition to the units common to various embodiments, the lines designated V, V′, V″, V‴ represent the plane of the directrix for the primary paraboloid A. The lines marked W, W′, W″, W‴ represent the plane of the directrix for the secondary paraboloid B.

Furthermore, the lines designated as X, X′ (and X″, X‴ in Fig. 9) represent the axis of element A; and the lines designated as Y, Y′ represent the axis of element B. The line designated as Z, Z′ in Figs. 2, 3, 6, 7, and 9 represents the third axis of the reflector system, perpendicular to both X, X′ and Y, Y′ at their intersection.

Referring specifically to Figs. 1–3, a type of reflector system is shown which is particularly adapted for use by vehicles such as automobiles, airplanes, or railroad locomotives, both because of its simple construction and because some 70% of the rays reflected may be readily redirected in any desired direction by a simple mechanical means as described hereafter for directing reflector D.

The reflector system of Figs. 1–3 comprises a primary paraboloid A, a secondary paraboloid B, a hemispherical reflector C, and a plane reflector D. G and H are two intersecting hollow cylindrical surfaces, with G extending downward from the primary paraboloid A and H placed at right angles to G. The source of electromagnetic energy is located at N, said point N being also the common focus of primary paraboloid A and secondary paraboloid B.

The theoretical paths of rays of energy emanating from source N now will be described only for purposes of illustration, the paths being shown in their approximate position. Ray *p* starts at N, strikes the primary paraboloid A at point 10, is reflected to point 11 on plane reflector D and directed outwardly therefrom in a direction 11—12, said direction 11—12 being parallel to the axis Y, Y′ of the secondary paraboloid B, ray *p* being reflected twice. The portion of ray *p* which is in the cut-away part of the cross section of Fig. 1 is shown in a short dashed line.

Ray *q* proceeds from point N to point 17 on secondary paraboloid B and thence in a direction 17—18, said direction 17—18 being parallel to the axis Y, Y′, ray *q* being reflected once and being parallel to ray *p* as it emerges from the system. Ray *q* is shown in Fig. 1 in a short dashed line because it is in the cut-away portion of the cross section.

Ray *r* first is directed to spherical surface C at point 13 and then returned through source N to point 14 on the primary paraboloid A, reflected to point 15, on the plane reflector D, and then in an outward direction 15—16, said ray 15—16 being parallel to 11—12 (ray *p*) and 17—18 (ray *q*). Ray *r* is reflected three times. The portion of ray *r* after it passes N is in a short dash line inasmuch as it is then in the cut-away portion of the cross section. As is apparent, the ray *r* crosses from one side of the reflector system to the other as it passes back through the source N.

Ray *s* is reflected from source N to point 19 on the hemispherical surface C, then to point 20 on secondary paraboloid B, and then in the direction 20—21, ray *s* at point of emergence being parallel to the other rays emerging from the system. Ray *s* is reflected twice. The portion of ray *s* from source N to point 19 is in the cut-away part of the section.

The aperture angle in Figs. 1–3 is 90° and it is to be noted that a plane passing through the point of joinder 31 of the secondary paraboloid B and the primary paraboloid A and through the source will pass through the line at 32 where the directrices of the primary and the secondary paraboloid intersect. As indicated by the dimensions in Table I, the rays will not be in phase in their passage out of the reflector.

When a beam is used to provide a carrier channel, a synchronization of the transmitted waves is important. In Fig. 4, an embodiment is shown wherein the distance 22—23 is the radius of the aperture of the primary paraboloidal section A in a plane perpendicular to its axis X, X′. The minimum distance from the focus to the aperture of primary paraboloid A is N—22, and the maximum distance from the focus to the aperture of A is N—23. The distance 22—23, distance N—22, and the maximum distance N—23 from the focus to the edge of the paraboloidal reflector A form a triangle which is similar to a right triangle whose sides are 20, 21 and 29 units, respectively. Each ray reflected by the primary paraboloid A travels the same distance from the focus, this distance by definition of a paraboloid being the distance between the plane of the directrix V, V′ and the plane of the aperture 24, 22, 23, this distance also being the same distance N—23 that each ray reflected by the secondary paraboloid travels since by construction point 23 is equidistant from V, V′ and W, W′. The aperture angle for the angle between the directrices may be readily computed, a value for the radius of the spherical section C and an appropriate parameter of the primary paraboloid A may also be selected of such dimensions that waves in their passage through the focus after reflection from the hemispherical reflector C and waves in the beam reflected by elements A, B, and D are all in phase as they move through, in and out of the system in parallel rays *p*, *q*, *r*, *s*.

The aperture angle in Fig. 4 is less than 90° and the rays *p*, *q*, *r*, *s* are shown with numerals identical to those described for Figs. 1 to 3, the same description applying thereto, the part of the rays in the cut-away portion of the section being shown in a short dash line.

Figs. 5, 6, and 7 show an embodiment wherein the aperture angle of the primary paraboloidal reflector exceeds 90° and wherein the primary paraboloid reflects outwardly. In this embodiment, the section of the spherical shell C also is modified so that it is appreciably smaller than a hemisphere. Its edge is determined by being made to intercept only those rays which would be reflected by the primary paraboloidal reflector A into the secondary paraboloidal reflector B or which would strike the former in the area which has to be cut away to permit the passage of the beam reflected by the secondary paraboloidal section B. The modification shown in Figs. 5, 6, and 7 probably would be best adapted to transmission of the communication carrier channels, television transmission, and other places where waves should be projected from a reflector system absolutely in phase in all parts at all times.

In Figs. 5–7, letters are used to designate the various parts corresponding to those described heretofore for Figs. 1–3 and for the purpose of simplicity only the paths of rays will be described which are not reflected back into the hemispherical section and then returned through the source due to the additional reflection by reflector C, the latter being apparent from inspection of the figures. Ray *t* emanates from the source at N, strikes the primary paraboloidal reflector A at 26, and is reflected outward in a direction 26—27 parallel to the axis X, X′ of the primary paraboloid A, thus being reflected once. Ray *u* strikes secondary paraboloidal reflector B at 28, is directed downward until it strikes reflector D at 29 and from there is reflected outward in a direction 29—30 parallel to ray *t* and being reflected twice. Ray *u* is shown in Fig. 5 in short dash lines as it is in the cut-away portion of the section.

Fig. 8 shows a minor modification of the system of Figs. 5–7 inclusive, the paths of rays and reference numerals being similar to Figs. 5, 6, and 7 and the same explanation applying thereto. There is shown in dotted lines in this figure one manner in which reflector D could be hinged to direct the ray 28—29 in a nonparallel direction to the rays of reflector A.

The modification shown in the front view of Fig. 9 is generally similar to that in Fig. 8 except that an elongated source of electromagnetic rays is used, the cross section of Fig. 8 applying to a system similar to the previous figures or to an extended system as in Fig. 9. (In Fig. 9, the lower reflector has not been extended bodily downwardly as has the lower reflector of Fig. 8.) This elongation of the system in a direction parallel to Z, Z′ can be accomplished by lengthening the appropriate reflector sections, in the same direction as the elongated source and making all extensions parallel to the intersection of the directrices of the paraboloidal sections A and B, all of the extensions being the same distance. Then by restricting the source to the smallest practicable diameter, the spreading rays will be limited to the plane of the extension.

Merely as an example, plane reflector D may be hinged at 33 as seen in Fig. 8 so as to change the direction of the beam if desired. Such a construction can be applied to any of the other embodiments and the hinge can be applied at any place at the edge of the reflector so as to direct the beam as desired.

It is apparent that various modifications may be made in the details and construction shown without departing from the spirit of the invention or scope of the appended claims.

It is claimed:

1. In an electromagnetic wave projector and the like system, the combination comprising a source of wave energy, a reflector for projecting some reflected rays from said source in a beam of parallel rays, a second reflector for receiving substantially all of the other rays from said source and reflecting them in a beam of parallel rays in a direction other than the beam from said first reflector, and a third reflector reflecting the beam from said second reflector.

2. In an electromagnetic wave projector system, the combination comprising a source of wave energy, a reflector for projecting reflected rays from said source in a beam of parallel rays, a second reflector for receiving directly from said source rays other than those projected by said first reflector and reflecting them in a beam of parallel rays in a direction other than the beam from said first reflector, and a third reflector reflecting the beam from said second reflector parallel to said first mentioned beam.

3. In an electromagnetic wave projector system, the combination comprising a source of wave energy, a first paraboloidal reflector for projecting rays therefrom in a given direction, a second paraboloidal reflector having its axis non-parallel relative to the axis of said first paraboloidal reflector and projecting substantially all other rays therefrom in a different direction than said first paraboloidal reflector, and a reflector having its axis angularly disposed relative to the axes of said paraboloidal reflectors to receive rays from one only of said reflectors.

4. In an electromagnetic wave energy reflector system having a concentration locus, the combination comprising; a first paraboloidal reflector for directing rays in a given direction relative to said locus; a second paraboloidal reflector having its axis non-parallel relative to the axis of said first paraboloidal reflector and having its focus coincident with the focus of the first reflector, said wave energy locus being located at said focus and the axes of said reflectors being angularly disposed relative to each other; and a third reflector having an axis angularly disposed to the axes of said paraboloidal reflectors and arranged to direct rays reflected by one of said reflectors in the same direction as the rays from the other of said reflectors.

5. In an electromagnetic wave projector system, the combination comprising a source of wave energy, a first paraboloidal reflector for projecting rays of said source in a forward direction and having its focus at said source, a second paraboloidal reflector having its axis angularly disposed relative to the axis of said first paraboloidal reflector and having its focus at said source, a plane reflector located at an angle relative to the axes of said paraboloidal reflectors to receive rays from one of said paraboloidal reflectors and reflect the same in a forward direction parallel to the first mentioned rays.

6. In a wave energy projector system, the combination comprising a source of wave energy, a first means intercepting and re-directing rays from said source in a beam of parallel rays, a second means intercepting and re-directing rays from said source in a second beam of parallel rays, and a third means in place of said first two means intercepting and returning through said source rays which would otherwise be directed from each of both said means, respectively, onto the other means, all rays being thereby projected in said two beams of parallel rays.

7. In an electromagnetic wave projector system, the combination comprising a source of wave energy, a first paraboloidal reflector for projecting rays in a predetermined direction, a second paraboloidal reflector having its axis angularly disposed to the axis of said first paraboloidal reflector projecting rays in a different direction than said first paraboloidal reflector, a spherically shaped reflector not exceeding a hemisphere contiguous to one of said paraboloidal reflectors and arranged to reflect rays of energy from said source to both of said reflectors, and a reflector having its axis angularly disposed relative to the axes of said paraboloidal reflectors to receive and reflect rays from one of said paraboloidal reflectors.

8. In an electromagnetic wave projector system, the combination comprising a source of energy; two paraboloidal reflectors having their focus at a common point where the source of energy is located, the axes of said reflectors being angularly disposed relative to each other, one of said reflectors having a reflecting surface within the other paraboloidal reflector; and a spherically shaped reflector having its focal center located at said focus of said paraboloidal reflectors and at said source of energy and receiving rays solely therefrom and re-directing them through said source to said reflectors.

9. In an electromagnetic wave projector system, the combination comprising a source of wave energy, a first paraboloidal reflector for projecting rays in a predetermined direction, a second paraboloidal reflector having its axis angularly disposed to the axis of said first paraboloidal reflector and having its focus coincident therewith and with said source of energy, a concave spherically shaped reflector not exceeding a hemisphere contiguous to one of said reflectors and having its axis of revolution located at said focus, and a fourth reflector having an axis angularly disposed to the axes of said paraboloidal reflectors and adapted to project rays from one of said paraboloidal reflectors in the same direction as the rays from the other of said paraboloidal reflectors.

10. In an electromagnetic wave projector system, the combination comprising a source of wave energy; a first paraboloidal reflector for projecting rays from said source in a predetermined direction; a second paraboloidal reflector for projecting rays from said source in a different direction, the axes of said paraboloids intersecting at the foci of said paraboloids, and a plane reflector angularly disposed to the axes of said paraboloids, said reflector being parallel to a line bisecting said axes and parallel to a plane bisecting the intersection of the planes of the directrices of said paraboloids, said reflector receiving and reflecting rays from one of said paraboloidal surfaces..

11. In an electromagnetic wave projector, the combination comprising a source of wave energy; a first paraboloidal reflector for projecting rays parallel to its axis of revolution; a second paraboloidal reflector for projecting rays from said source parallel to the axis of said second reflector, said first reflector having a reflecting surface within said second paraboloid, the axes of said paraboloids being angularly disposed to each other and intersecting at the common foci thereof and where the source of energy is located; a concave spherically shaped reflector having its axis of revolution located at said focus and its surface intercepting said second paraboloid so that no rays are reflected from said second reflector into said first reflector; and a plane reflector angularly disposed to the axes of said paraboloids and receiving rays from said second reflector and projecting them outwardly in parallel rays in a beam parallel to the beam projected by said first reflector.

12. In an electromagnetic wave projector the combination comprising a source of wave energy; a first paraboloidal reflector for projecting rays parallel to its axis; a second paraboloidal reflector for projecting rays from said source parallel to the axis of said second reflector, said second reflector having a reflecting surface within said first paraboloid, the axes of said paraboloids being angularly disposed to each other and intersecting at their foci and where the source of energy is located; a concave spherically shaped reflector having its center located at said focus and its surface intercepting said first paraboloidal reflector so that no rays are reflected from said first reflector into said second reflector; and a plane reflector angularly disposed to the axes of said paraboloids and receiving rays from said second reflector and projecting them outwardly in parallel rays in a beam parallel to the beam projected by said first reflector.

13. In an electromagnetic wave projector system, the combination comprising a source of energy; a reflector for projecting rays from said source in a beam of parallel rays; a second reflector for receiving directly from said source rays other than those projected by said first reflector and reflecting them in a beam of parallel rays in a direction other than that of the beam from said first reflector; a third reflector normally reflecting the beam from said second reflector parallel to said first mentioned beam; and means for tilting said third reflector so as to change the direction of said second beam relative to said first mentioned beam.

14. In a wave energy projector and the like, the combination comprising a source of electromagnetic wave energy, means dividing part of the waves from said source and redirecting them once into an outwardly directed beam of substantially parallel rays, and means intercepting and redirecting the rest of said waves from said source and redirecting some of them two times and some three times in a series of redirections into an outwardly directed beam of parallel rays.

15. In a wave energy projector and the like, the combination comprising a source of wave energy, means dividing part of the waves from said source and redirecting them once into an outwardly directed beam of substantially parallel rays, and means intercepting and redirecting the rest of said waves from said source, said second mentioned means redirecting some of them three times into an outwardly directed beam of parallel rays, said means being arranged to emit said waves in parallel beams and in phase with each other in said beams.

WALTER FREEMAN CRAWFORD.

REFERENCES CITED

The following references are of record in the file of this patent:

UNITED STATES PATENTS

| Number | Name | Date |
|---|---|---|
| 908,838 | Brown | Jan. 5, 1909 |
| 1,300,202 | Stubblefield | Apr. 8, 1919 |
| 1,445,306 | Epstein | Feb. 13, 1923 |
| 1,462,036 | Graham | July 17, 1923 |
| 1,478,564 | Hallett | Dec. 25, 1923 |
| 1,721,425 | Winzenburg | July 16, 1929 |
| 1,858,702 | Chambers | May 17, 1932 |
| 1,913,517 | Smith et al. | June 13, 1933 |

(Other references on following page)

UNITED STATES PATENTS

| Number | Name | Date |
|---|---|---|
| 1,931,980 | Clavier | Oct. 24, 1933 |
| 1,981,328 | Rivier | Nov. 20, 1934 |
| 2,018,829 | Berry | Oct. 29, 1935 |
| 2,059,033 | Rivier | Oct. 27, 1936 |
| 2,078,302 | Wolff | Apr. 27, 1937 |
| 2,118,419 | Scharlau | May 24, 1938 |
| 2,191,379 | Glasgow | Feb. 20, 1940 |
| 2,198,014 | Ott | Apr. 23, 1940 |
| 2,283,935 | King | May 26, 1942 |

FOREIGN PATENTS

| Number | Country | Date |
|---|---|---|
| 481,152 | France | Nov. 8, 1916 |
| 770,482 | France | Sept. 14, 1934 |
| 678,010 | Germany | June 8, 1939 |
| 410,336 | Great Britain | May 17, 1934 |